United States Patent
Vanesky

[19]

[11] Patent Number: 5,851,036
[45] Date of Patent: Dec. 22, 1998

[54] PERMANENT FITTING FOR FLUID-TIGHT CONNECTIONS

[76] Inventor: Frank W. Vanesky, 1841 Goldenrod La., Vista, Calif. 92083

[21] Appl. No.: 767,251

[22] Filed: Dec. 13, 1996

Related U.S. Application Data

[63] Continuation-in-part of Ser. No. 573,959, Dec. 14, 1995, Pat. No. 5,685,577.

[51] Int. Cl.⁶ ..................................................... F16L 47/02
[52] U.S. Cl. .................................... 285/294.1; 285/294.3; 285/369; 285/915; 285/110; 156/305; 403/268
[58] Field of Search .............................. 285/294.1, 294.3, 285/296.1, 369, 915, 110; 156/294, 305; 403/265, 266, 268

[56] References Cited

U.S. PATENT DOCUMENTS

| | | |
|---|---|---|
| 344,760 | 1/1886 | Wilbur . |
| 868,349 | 10/1907 | Lomax . |
| 978,346 | 12/1910 | Yarrow . |
| 1,292,072 | 1/1919 | Booney . |
| 1,877,433 | 9/1932 | Brook . |
| 2,313,074 | 3/1943 | Jewell . |
| 3,860,270 | 1/1975 | Arnold . |
| 3,999,786 | 12/1976 | Powondra . |
| 4,226,444 | 10/1980 | Bunyan . |
| 4,605,466 | 8/1986 | Eisenzimmer . |
| 4,715,474 | 12/1987 | Wehmeyer . |
| 4,783,099 | 11/1988 | Muser . |
| 4,804,209 | 2/1989 | Fischer . |
| 4,830,409 | 5/1989 | Freeman . |
| 5,127,116 | 7/1992 | Greig . |
| 5,152,481 | 10/1992 | Cote et al. . |
| 5,320,389 | 6/1994 | Dupont, Jr. . |
| 5,383,740 | 1/1995 | Lancelot, III . |

FOREIGN PATENT DOCUMENTS

| | | |
|---|---|---|
| 41 27 775 A1 | 2/1993 | Germany . |
| 661-109-A | 6/1987 | Switzerland . |

OTHER PUBLICATIONS

ASTM Standard Specification F545–93 (1993).
ASTM Standard Specification D2661–94a (1994).
ASTM Standard Specification D2665–94 (1994).

*Primary Examiner*—Heather Shackelford
*Attorney, Agent, or Firm*—Gregory Garmong

[57] ABSTRACT

A pipe connector has a coupling with a first cylindrical land, a second cylindrical land, and a third cylindrical land. There is a first annular recess defined between the first cylindrical land and the second cylindrical land, and a second annular recess defined between the second cylindrical land and the third cylindrical land. A gate channel communicates between the two recesses through the second cylindrical land. Circumferential seals extend around the first and third cylindrical lands. A cement injection port communicates between the outside of the connector and the first recess, and a cement vent port communicates between the outside of the connector and the second recess. In use, a pipe is inserted into the coupling to rest upon the three lands, and cement is forced into the injection port. The cement flows circumferentially around the first annular recess, through the gate opening, circumferentially around the second annular recess, and out through the vent port. The seals prevent the cement from flowing out of the interior of the connector.

20 Claims, 6 Drawing Sheets

PERMANENT FITTING FOR FLUID-TIGHT CONNECTIONS

This application is a continuation-in-part of application Ser. No. 08/573,959, filed Dec. 14, 1995, now U.S. Pat. No. 5,685,571 for which priority is claimed.

BACKGROUND OF THE INVENTION

This invention relates to pipe fittings which are bound to pipe with a permanent cement, and, more particularly, to such fittings wherein the cement is injected into the fitting.

Pipes are assembled into fluid-conduction systems with fittings. In an approach commonly used in home interior plumbing and outdoor irrigation systems, plastic pipes are joined with plastic fittings. To build the fluid-conduction system, the pipes are normally cut to length, and then the pipe segments and fittings are "dry fitted" together without any permanent cement present to be certain that the lengths and configurations are correct. The joints are thereafter serially disassembled, cement is applied to the joint of each fitting/pipe pair (optionally with a primer applied prior to the cement, where required) and the fitting and pipe are permanently reassembled by forcing the pipe into the fitting. This latter sequence of steps is often termed "solvent welding".

This approach, while widely used, has some disadvantages. When the permanent joining is made, an excess of cement is normally used. The excess is extruded out of the ends of the fitting or into its interior. Upon hardening, the cement may block a significant portion of the interior cross-sectional area of the pipe, particularly where the pipe is of small diameter. The permanent assembly is desirably made with a twisting motion between the pipe and the fitting in an attempt to ensure good circumferential contact of the cement to the pipe and the interior of the fitting, but that twisting motion may not be possible for some of the joints. The cement often is made with a chemistry designed to set quickly, so that the reassembly must be made very quickly, which sometimes leads to errors. Even when the reassembly is made properly, local dry spots in the cement joint may occur. The dry spots are the principal cause of leaks in such joints. Moreover, if a mistake is made in the dry fitting or during wet assembly and not discovered until after the solvent welding is completed, a portion of the fluid-conduction system must be cut out and replaced. In tight spots, the permanent assembly of the last portions of the fluid-conduction system after the earlier portions have been permanently assembled can be difficult due to space constraints. Lastly, the solvent in the cement is evolved during the painting of cement onto the parts and from any exposed cement during the drying of the cement, which can be injurious to the user.

To overcome these problems, there have been proposed injection fittings wherein the fittings and the pipes are assembled and then the cement is injected between the fitting and the pipe to make the assembly permanent. The existing injection fitting structures and techniques have not been fully satisfactory due to incomplete coverage of the cement over the internal surface of the joint, which can lead to weakness and leaking at the joint, and messiness due to leaking cement. The prior cement-injection fitting approaches have also not taken the irregular nature of the piping material into account. Most plastic pipe is formed by extrusion, and as a result in many cases the pipe is somewhat non-cylindrical and of non-uniform diameter. The previously known fittings for use in cement-injection techniques have been suitable under the assumption that the plastic pipe was uniform, but have been more difficult or impossible to use where non-uniform pipe, of the type found in commerce, was utilized.

There is a need for an improved fitting and approach for use in the permanent joining of pipe segments. The present invention fulfills this need, and further provides related advantages.

SUMMARY OF THE INVENTION

The present invention provides a coupling and fitting structure for making connections to pipe and in other applications. The approach produces a mechanically strong joint that is leak free, even when the pipe to be connected is somewhat irregular. The coupling structure is readily manufactured in a variety of configurations. Using this approach, piping arrays are assembled quickly and conveniently in a trial arrangement and then permanently solvent bonded without time-consuming disassembly and its associated opportunities for error, and without exposing the user to significant amounts of volatile solvent vapors.

In accordance with the invention, a connector structure to be used with a pipe of a pipe nominal diameter comprises a hollow body having an external surface and including at least a first coupling. The first coupling includes a first cylindrical internal land, a second cylindrical internal land, and a third cylindrical internal land. The first cylindrical land, the second cylindrical land, and the third cylindrical land are collinear and of a diameter sufficiently larger than the pipe nominal diameter to permit the pipe to be slipped into the hollow body to rest upon the lands. There is a circumferentially extending internal first recess lying between the first cylindrical land and the second cylindrical land, a circumferentially extending internal second recess lying between the second cylindrical land and the third cylindrical land, and a gate channel through the second cylindrical land communicating between the first recess and the second recess at a gate channel circumferential location. An injection port communicates between the first recess and the external surface at a port circumferential location which is remote from the gate channel circumferential location, and which is preferably displaced by about 180 degrees around the circumference of the body from the gate channel circumferential location. A vent port communicates between the second recess and the external surface at about the same circumferential position as the port circumferential location. The vent port preferably has a smaller cross-sectional area than the injection port to ensure a positive pressure within the recesses during injection of cement. Additional couplings of the same design can be provided to form straight fittings, elbow fittings, T-fittings, integral fittings, and other types of fittings as may be desired.

Preferably, seals are provided at the ends of the coupling on the first and third lands. These seals prevent cement from being forced out of the annular regions defined by the recesses during injection of cement. The seals may be of any operable type, including an O-ring seal, an integrally molded compliant seal, or a flap seal of the same material used in the body of the structure.

In use, the pipe is inserted into the coupling to rest on the three lands. A stop is preferably provided at the end of the coupling to define the proper position for the pipe. Without any disassembly, cement is injected into the injection port to flow around the circumference of the pipe in the first recess, through the gate channel, around the circumference of the pipe in the second recess, and out the vent port. When cement emerges from the vent port, the filling is complete.

The small amount of exposed cement emits only a small fraction of the solvent vapors produced by the conventional approach used to solvent weld pipes. The cement is allowed to harden to complete the solvent bonding, while other joints are filled.

More generally, a connector structure comprises a hollow body having an external surface and including at least a first coupling. The first coupling includes a first internal land, a second internal land, and a third internal land, wherein the first land, second land, and third land are collinear and congruent. A circumferentially extending internal first recess lies between the first land and the second land, a circumferentially extending internal second recess lies between the second land and the third land, and a gate channel through the second land communicates between the first recess and the second recess at a gate channel circumferential location. An injection port communicates between the first recess and the external surface at a port circumferential location. The port circumferential location is displaced by about 180 degrees around the circumference of the body from the gate channel circumferential location. A vent port communicates between the second recess and the external surface at about the port circumferential location.

The present approach thus provides a fitting and an approach for its use. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
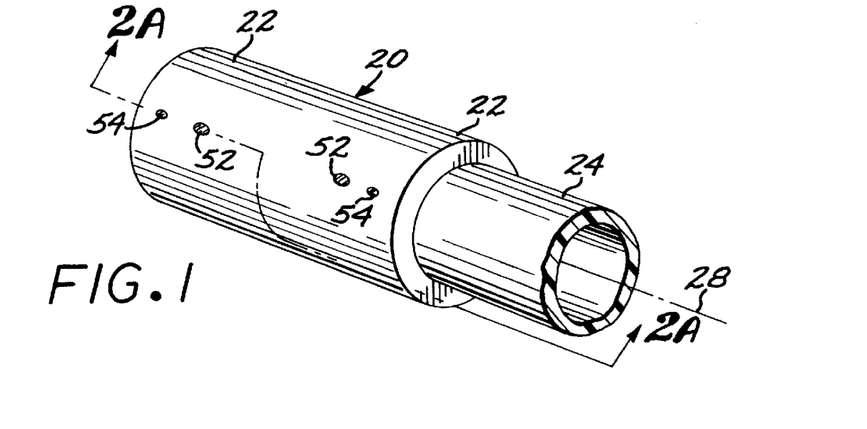
FIG. 1 is a perspective view of a fitting having a coupling, with a piece of pipe inserted into the coupling.

FIG. 1 illustrates a fitting 20 having at least one coupling 22, and in this case two couplings 22, one at each end of the linear fitting 20. One end of a length of pipe 24 is inserted into one of the couplings 22, with the remainder of the length of pipe 24 protruding from the coupling 22.

Figure 2A:
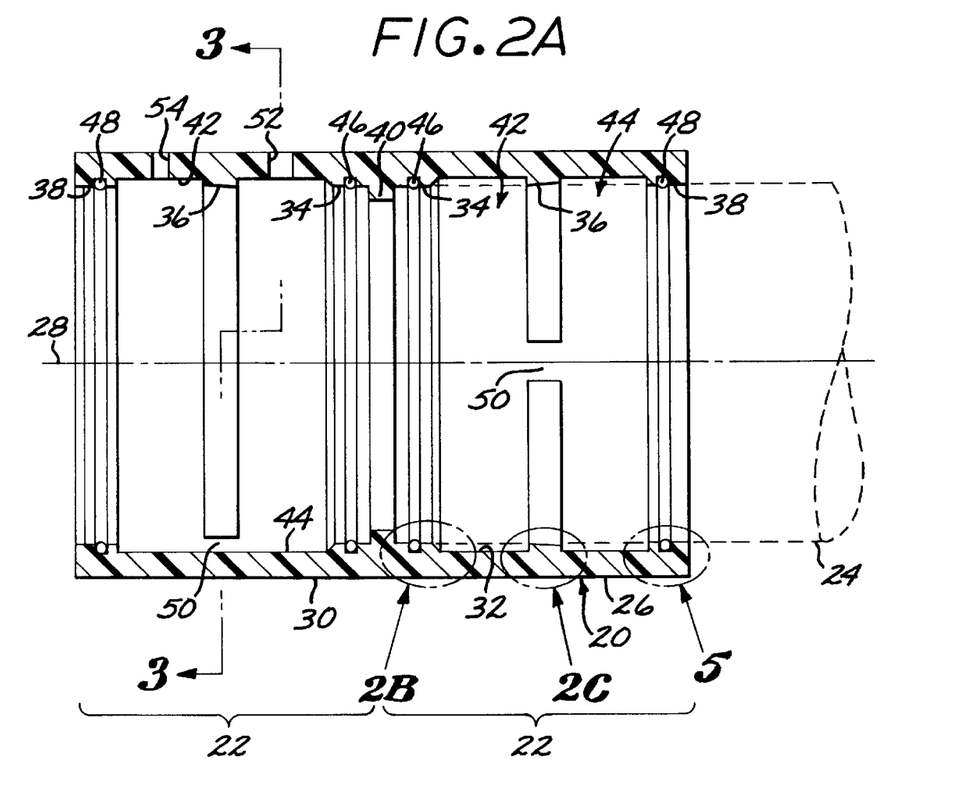
FIG. 2A is a sectional view of the fitting of FIG. 1, taken along lines 2A—2A.

FIG. 2A is a sectional view of the fitting 20 and the two couplings 22. The length of pipe 24 inserted into the rightmost coupling 22 is shown in dashed lines. The coupling 22 is formed as a hollow body 26 which is generally cylindrical and has a cylindrical axis 28, although features described herein preclude perfect cylindrical symmetry. The body has an external surface 30, which is generally cylindrical and an internal surface 32 which also is generally cylindrical but which has a number of features thereon.

The internal surface 32 includes a first cylindrical internal land 34 extending around the circumference of the internal surface 32. As used herein, a "land" is a raised region adjacent to a recess in a surface. In some cases, the land lies between two recesses, while in other cases the land lies adjacent to only one recess. The internal surface 32 further includes a second cylindrical internal land 36 spaced apart from the first cylindrical internal land 34 along the axis 28 and a third cylindrical internal land 38 spaced apart from the second cylindrical internal land 36 along the axis 28. The first cylindrical internal land 34, the second cylindrical internal land 36, and the third cylindrical internal land 38 of any one coupling 22 are collinear and of a cylindrical diameter sufficiently large to admit the end of the pipe 24 therein such that the pipe 24 rests upon the lands 34, 36, and 38 when inserted into the coupling 22. Desirably, a stop 40 extending toward the axis 28 is provided on the first land 34 to establish the proper extent to which the end of the pipe 24 may be inserted into the coupling 22. When the pipe 24 is inserted into the coupling 22, the end of the pipe engages the stop 40 to limit the degree of insertion.

Figure 2B:
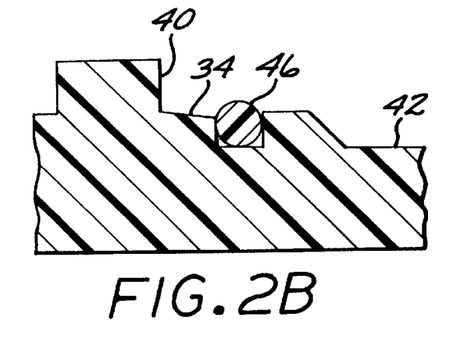
FIG. 2B is an enlarged sectional view of a secondary embodiment of the first land and stop.
Figure 2C:
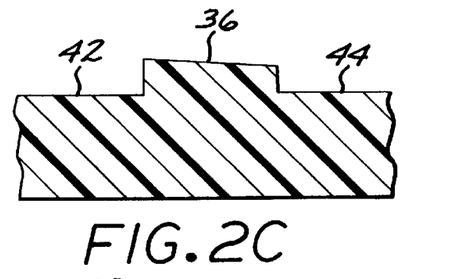
FIG. 2C is an enlarged sectional view of a secondary embodiment of the second land.

The first land 34 may be flat as shown in FIG. 2A, or tapered inwardly with increasing distance from the third land 38, as shown in FIG. 2B. The second land 36 may be flat as shown in FIG. 2A, or tapered inwardly with increasing distance from the third land 38, as shown in FIG. 2C. The third land 38 is preferably flat in all cases but with a seal structure to be discussed subsequently. The tapers in the first land and second land, where present, aid in guiding the pipe 24 into its properly seated position.

A circumferentially extending first recess 42 lies between the first land 34 and the second land 36. A circumferentially extending second recess 44 lies between the second land 36 and the third land 38. In the illustrated preferred embodiment the recesses 42 and 44 are each depicted as a flat-bottomed annulus lying between the local portion of the internal surface 32 and the pipe 24 when the pipe is inserted into the coupling 22. Other shapes of the recesses are also operable.

Preferably, a first circumferential seal 46 is present on the first land 34 and a second circumferential seal 48 is present on the third land 38. The seal 46 retains a pressure in the first recess 42 and prevents any fluid cement present in the first recess 42 from leaking past the stop 40 and into the interior of the pipe 24. The seal 48 retains a pressure in the second recess 44 and prevents any fluid cement present in the second recess 44 from leaking out of the coupling 22.

A gate channel 50 extends axially through the second land 36 and communicates fluid pressure and fluid flow between the first recess 42 and the second recess 44.

A fluid injection port 52 extends through the body 26 of the coupling 22 and into the first recess 42, thereby communicating fluid pressure and fluid flow between the exterior of the coupling 22 and the first recess 42. A fluid vent port 54 extends through the body 26 of the coupling 22 and into the second recess 44, thereby communicating fluid pressure and fluid flow between the second recess 44 and the exterior of the coupling 22. The vent port 54 is preferably of a smaller cross-sectional area than the injection port 52, so that the vent port supports a pressure within the recesses 42, 44 when fluid cement is injected through the injection port 52 into the recesses 42, 44. The ports 52 and 54 may be seen in the exterior view of FIG. 1 and in the leftmost coupling of FIG. 2A, which has been drawn rotated by 90 degrees from the rightmost coupling of FIG. 2A so as to illustrate the ports.

Figures 3, 4:
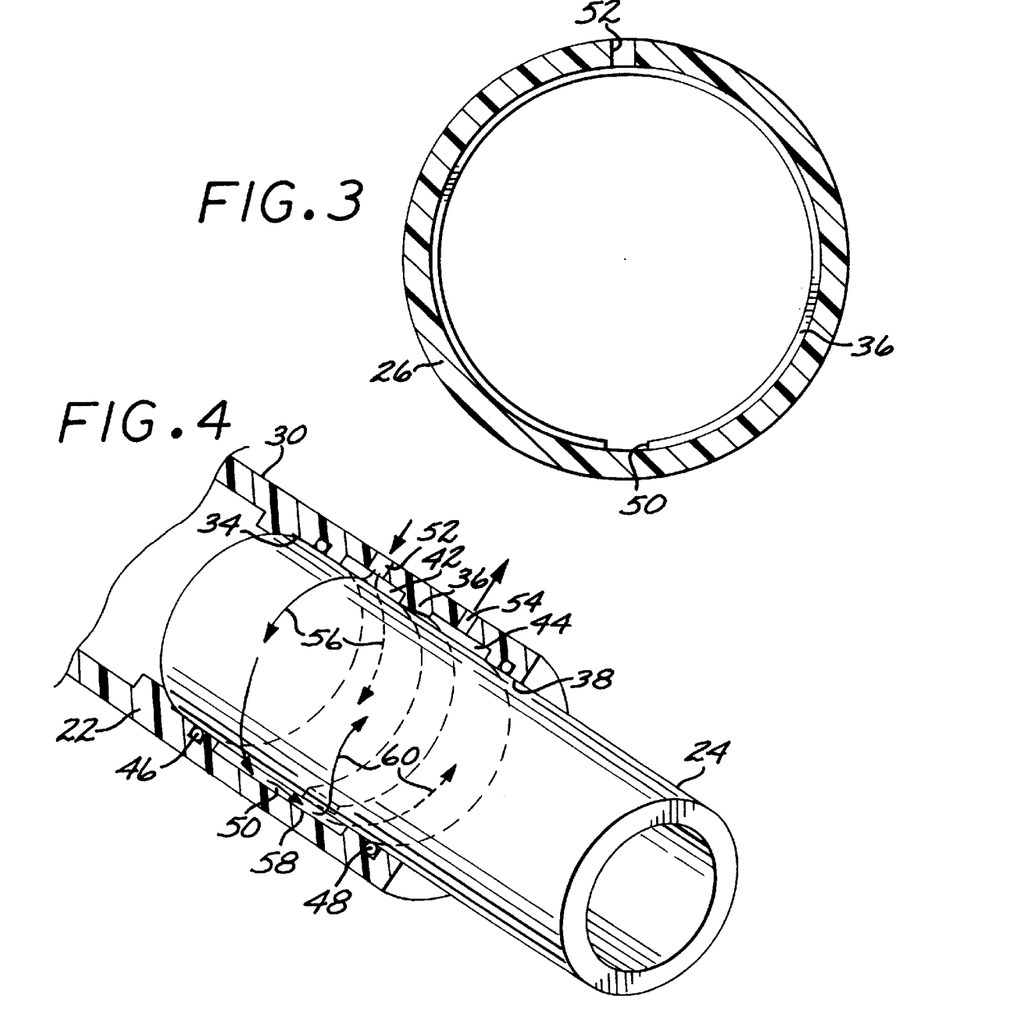
FIG. 3 is a sectional view of the fitting of FIG. 1, taken along lines 3—3 of FIG. 2A.
FIG. 4 is a schematic perspective cutaway view of the fitting of FIG. 1, illustrating the liquid cement flow paths.

The ports 52, 54, on the one hand, and the gate channel 50, on the other, are located at circumferentially remote locations of the coupling 22, and preferably at approximately diametrically opposite locations of the coupling 22, when the coupling is viewed end-on as in FIG. 3. The two ports 52 and 54 are located at a port circumferential location and the gate channel 50 is located at a gate channel circumferential location that is circumferentially spaced about 180° from the port circumferential location. The circumferential spacing need not be exactly 180°, but should be such that the ports 52, 54 and the gate channel 50 are roughly oppositely positioned for the reasons to be discussed next.

FIG. 4 illustrates the fluid flow path when a fluid, specifically a fluid plastic cement, is used to solvent weld and thence permanently bond the pipe 24 to the coupling 22. The fluid cement is injected into the injection port 52 using any convenient device such as a syringe or a pump that seals to the external surface 30 around the injection port 52 so that the fluid is directed into the injection port 52 under pressure. The fluid cement enters the first annular recess 42 and flows circumferentially through the recess 42 toward the circumferentially opposite side of the coupling 22. The fluid cement flows in both circumferential directions from the injection port 52, as indicated by the flow lines 56, to completely fill the first annular recess 42. Upon reaching the region of the first recess 42 that is circumferentially opposite to the injection port 52, the fluid cement flows through the gate channel 50, as indicated by the flow line 58. The fluid cement then enters the second annular recess 44 and flows circumferentially through the recess 44 toward the opposite side of the coupling 22 and thence to the fluid vent port 54. The fluid cement flows in both circumferential directions from the gate channel 50, as indicated by the flow lines 60, filling the second annular recess 44. The complete filling of the recesses 42 and 44 is important for mechanical strength of the joint and also to prevent leakage through the joint when the coupling is in service.

Tests using prototype couplings 22 fashioned from a transparent material and a dyed fluid cement have verified the fluid flow paths described in the preceding paragraph. The reduced cross-sectional area of the fluid vent port 54 aids in maintaining a positive pressure of fluid cement within the recesses 42, 44 during this filling operation, ensuring that the recesses are fully filled with the cement. The circumferential flow of fluid cement in the first recess 42 mandated by the oppositely disposed injection port 52 and gate channel 50 and the circumferential flow of fluid cement in the second recess 44 mandated by the oppositely disposed gate channel 50 and vent port 54 ensures a shearing action between the fluid cement on the one hand, and the surface of the recesses and the pipe on the other. The seals 46 and 48 prevent fluid cement from leaking out of the recesses 42, 44 during this cement injection operation. When the person performing the solvent welding and bonding operation sees fluid cement begin to emerge from the vent port 54, the recesses 42, 44 have been filled and no further fluid cement need be injected. In an extension of this testing technique to commercial service, the fittings and couplings may be made from a transparent plastic material and a colored dye may be mixed into the cement, so that the user can visually verify the success and completion of the solvent bonding operation.

The shearing action achieved by the structure of the fitting simulates the manual rotation of the fitting and the pipe that is used in conventional fitting systems, thereby achieving a full wetted bonding of the external surface of the pipe to the internal surface of the fitting, but without any manual rotation. It is therefore possible to dry assemble the piping system and then permanently solvent weld and bond the fittings and pipes without disassembly or using relative rotation during the solvent welding operation. The dry assembly and permanent bonding operation is therefore accomplished much faster and more economically than in the conventional approach.

Figure 5:
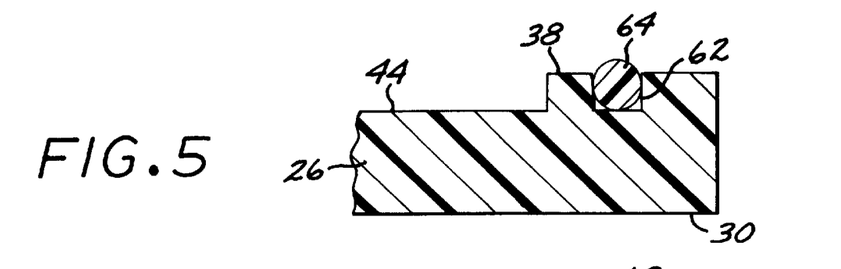
FIG. 5 is an enlarged detail of a first embodiment of the second circumferential seal of the fitting of FIG. 1, taken in the region 5 of FIG. 2A.
Figure 6:
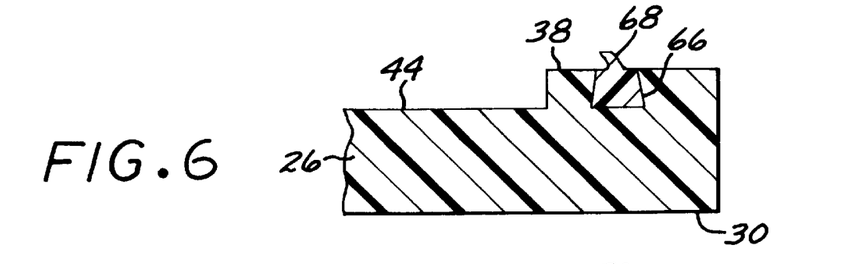
FIG. 6 is an enlarged detail of a second embodiment of second circumferential seal of the fitting of FIG. 1, taken in the region 5 of FIG. 2A.
Figure 7:
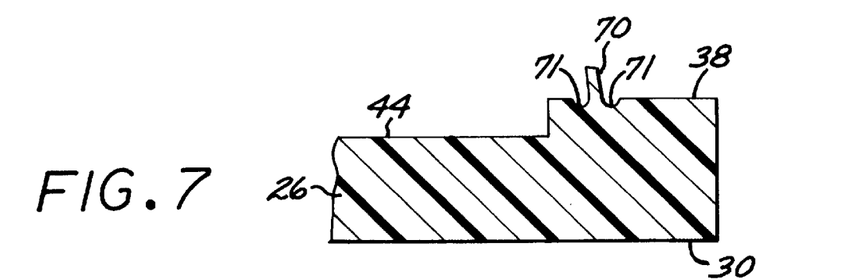
FIG. 7 is an enlarged detail of a third embodiment of the second circumferential seal of the fitting of FIG. 1, taken in the region 5 of FIG. 2A.

FIGS. 5–7 illustrate three preferred embodiments of the seals 46, 48. These embodiments are illustrated for the second seal 48, but are equally applicable to the first seal 46. In the embodiment of FIG. 5, a circumferential O-ring groove 62 is formed in the third land 38, and an elastomeric O-ring 64 is placed into the groove 62. In the embodiment of FIG. 6, a circumferential slot 66 is molded into the third land 38, and a circumferentially extending elastomeric insert 68 is formed in the slot 66 and extending out of the slot 66. The insert 68 may, for example, be configured in the manner of an O-ring, or it may have a flap-like wiper/seal shape as illustrated in FIG. 6 which permits the pipe to slide from right to left across the seal but acts to retain the fluid cement within the adjacent recess 44 during fluid cement injection. In both of the embodiments of FIGS. 5 and 6, the body 26 of the coupling 22 is typically formed of a hard, rigid plastic material such as PVC (Poly(Vinyl Chloride)), ABS (Acrylonitrile-Butadiene-Styrene), or CPVC (Chlorinated Poly(Vinyl Chloride)). The O-ring 64 and the insert 68 are formed of an elastomeric, rubbery material that is resistant to damage by solvents. The preferred materials for the O-ring 64 and the insert 68 are the polyolefins such as polypropylene, polyethylene, or polybutene. In the approach of FIG. 5, the body 26 is typically injection molded, the O-ring 64 is separately formed, and the O-ring 64 is thereafter inserted into the O-ring groove 62. In the approach of FIG. 6, the body 26 is typically injection molded in a first injection molding operation, and the insert 68 is molded in place in a second, sequential injection molding operation.

Another version of the seal is illustrated in FIG. 7. Here, the seal is a thin, circumferentially extending flap 70 protruding radially inwardly from the third land 38. The flap 70 is made sufficiently thin so as to be flexible and bend so as to scrape across the surface of the pipe when the pipe is inserted into the coupling. The flap 70 thus forms a seal between the coupling and the pipe. The flap 70 is made of the same hard, rigid material as the body 26 and is co-formed with the remainder of the coupling, preferably by injection molding. The flap 70 is, however, sufficiently thin, preferably on the order of about 0.005 inches thick in the axial direction, that it can bend somewhat to conform to the surface of the pipe. Optional circumferential undercuts 71 on either side of the flap 70 also aid in achieving a required small degree of flexibility of the flap.

The seal embodiments of FIGS. 5 and 6 are tighter and less subject to leakage of the fluid cement during the solvent bonding operation than the seal embodiment of FIG. 7. On the other hand, the seal embodiment of FIG. 7 is less expensive to produce than those of FIGS. 5 and 6. The tradeoff between seal performance and cost is used to advantage when the fittings are designed for particular applications. For a home water drain system using relatively large-diameter piping, for example, a slight leaking of the fluid cement during the injection operation may be less important than achieving a low cost of the fittings, so the seal of FIG. 7 is preferably used. For a laboratory piping system using small-diameter piping, for example, where any leakage around the first seal 46 may obscure a portion of the flow path through the fitting and fitting cost is less of a concern, one of the embodiments of FIGS. 5 and 6 is preferably used.

Figure 8:
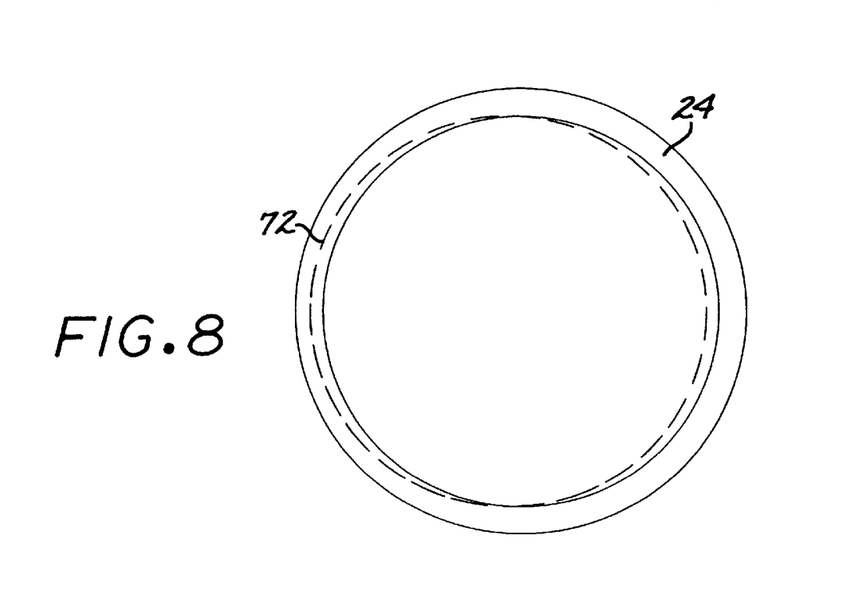
FIG. 8 is a schematic cross-sectional depiction of the configuration of typical piping.

FIG. 8 is a schematic cross-sectional view of a piece of pipe 24 such as purchased commercially and with which the fitting 20 of the invention is typically used. The pipe 24 is manufactured commercially by an extrusion operation, which is inexpensive but often leads to irregularities in wall thickness, diameter, and concentricity of the pipe. These irregularities are illustrated in reference to a perfect circle 72 that is circumscribed in the pipe 24. Commercial pipe specifications permit such irregularities. For example, ASTM Specification D2665-94 for Poly(Vinyl Chloride) drain, waste, and vent pipe with a nominal 2 inch inside diameter permits an outside diameter of 2.375±0.006 inches with a permissible deviation of the diameter (i.e., out of roundness) of ±0.012 inches. ASTM Specification D2661-94a for Acrylonitrile-Butadiene-Styrene Schedule 40 pipe with a nominal 2 inch inside diameter permits an outside diameter of 2.375+0.010/−0.000 inches with a permissible deviation of the diameter (i.e., out of roundness) of 0.024 inches.

The fitting 20 and coupling 22 of the invention are designed to accommodate these irregularities in commercially available pipe without loss of function. In the absence of the three lands 34, 36, and 38, the pipe 24 would fit within the coupling 22 on an irregular, off-center manner. This positioning of the pipe within the coupling, and consequent irregularity in the thicknesses of the annular region(s), would cause the fluid cement to flow in an irregular manner so that full circumferential coverage and thence a strong mechanical bonding and good sealing of the pipe to the coupling would be problematical. Once the pipe is rested upon the lands so that the sizes of the recesses 42, 44 are well established, the seals 46 and 48 serve to achieve sealing of the fluid cement during the injection operation, regardless of irregularities in the external shape of the pipe 24. The lands and seals thus cooperate so that the lands may be made sufficiently oversize in diameter to receive pipe that is within the maximum limits of the commercial specifications, with the seals extending sufficiently far inwardly to accommodate the irregularities in the external surface of the pipe permitted by the commercial specifications. Previously known designs of injection fittings did not have such a configuration and its associated benefits.

Figure 9:
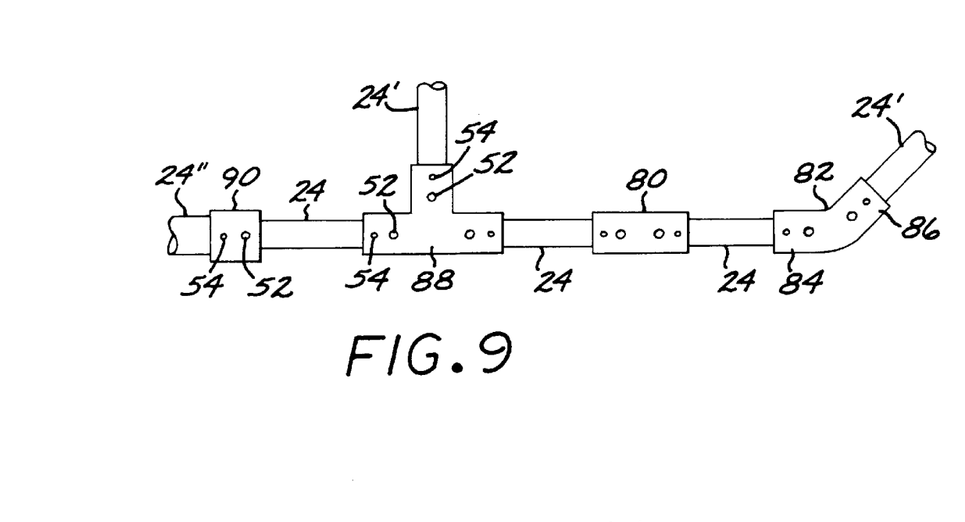
FIG. 9 is an elevational view of a portion of the fluid conduction system utilizing the approach of the invention.

The fitting 20 and coupling 22 of the invention may be made in any size and configuration that may be required for a specific application, and FIG. 9 illustrates some of the alternatives. In FIG. 9, the fitting 80 is a straight fitting with couplings at the opposite ends, as has been discussed in relation to FIG. 2A. The fitting 82 is an elbow fitting (which could be a 90° fitting or of any other desired angle) with a first coupling 84 being for a pipe 24 having a first diameter and a second coupling 86 being for a pipe 24' having a second diameter. The fitting 88 is a T-fitting having three couplings, the linear fittings being used with the pipe 24 having the first diameter and the fitting at 90° being used with the pipe 24' having the second diameter. The fitting 90 also illustrates that the positions of the injection port 52 and the vent port 54 may be reversed as between communication with the first and second recesses. The fitting 90 is an integral fitting co-formed with the pipe 24" at its end. An integral fitting may also be formed on other articles such as valves or other types of hardware. Such integral fittings would typically be injection molded integrally with the hardware to which they are attached.

Figure 10:
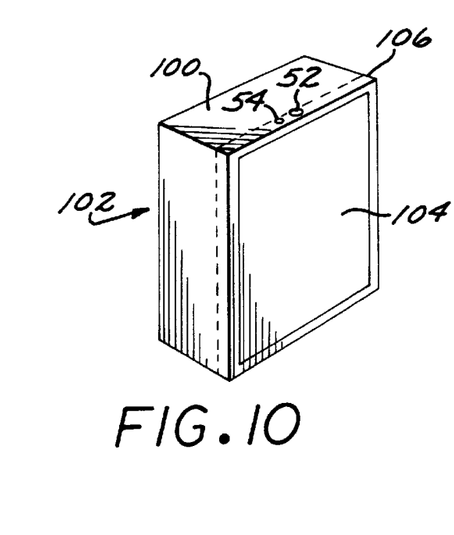
FIG. 10 is a perspective view of a non-cylindrical hermetically sealed assembly.

The preferred embodiment of the present invention is found in fittings used with generally cylindrical piping as discussed in relation to FIGS. 1–9, but the invention is not so limited. The sealing approach may be used in any other suitable application, with an example shown in FIG. 10. A base 100 of a box 102 whose lid 104 is to be hermetically sealed in place is provided with a coupling 106 like that discussed previously, except that the coupling is not cylindrical but has the desired shape of the rim of the lid 104, in this case a rectangle. The internal structure of the coupling 106 follows the same principles as those discussed previously.

Figure 11:
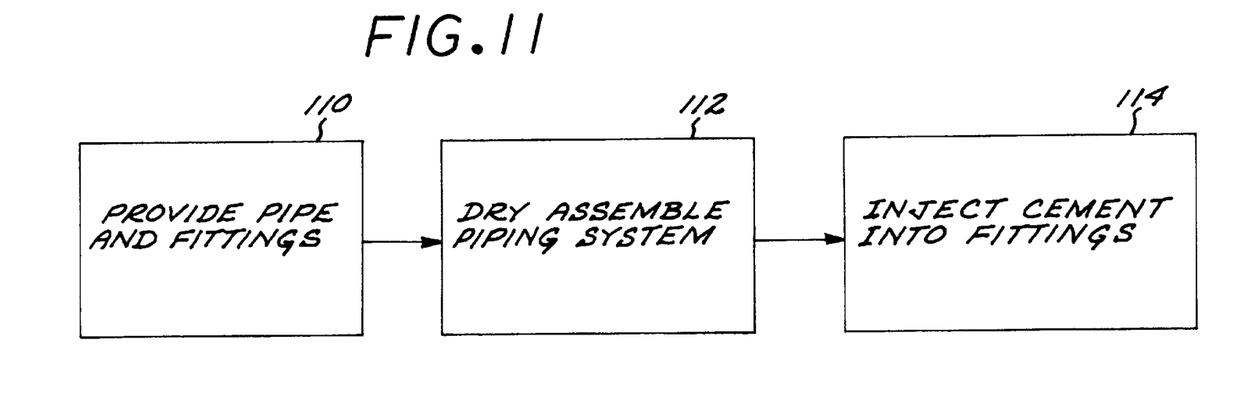
FIG. 11 is a block diagram of the preferred approach for utilizing the fittings of the invention.

FIG. 11 illustrates the preferred practice of the present invention. The pipe and fittings discussed previously are provided, numeral 110, and dry fitted together, numeral 112. By "dry fitting" is meant that the parts are fitted together with no cement present, so that the sizes and lengths can be adjusted as necessary to achieve the desired system. After dry fitting is complete, fluid cement is injected into the fluid injection ports 52 in a sequential manner, one fitting after the next, numeral 114. The cement is allowed to harden, completing the permanent assembly of the piping system. No disassembly is performed between steps 112 and 114 to coat the parts with cement.

Figure 12:
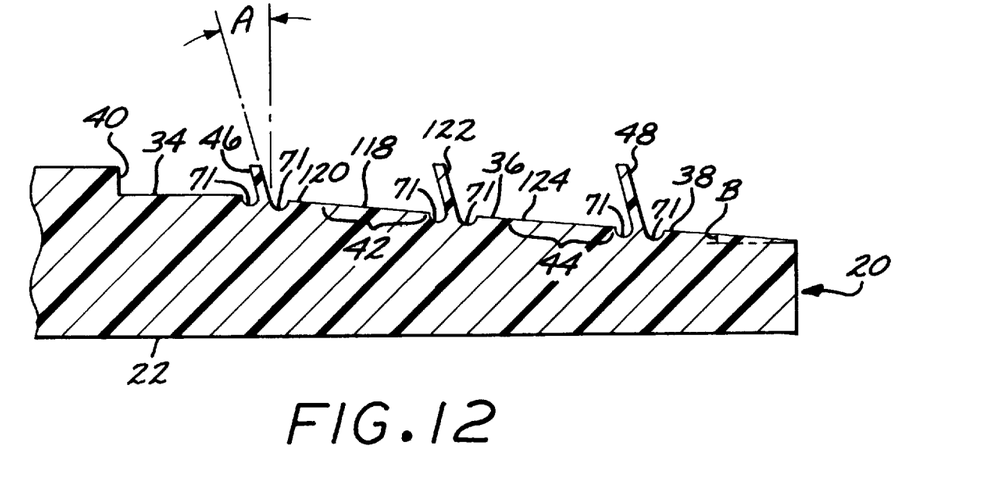
FIG. 12 is an enlarged partial sectional view like that of FIG. 2B, showing a further embodiment of the internal profile of the fitting.
Figure 14:
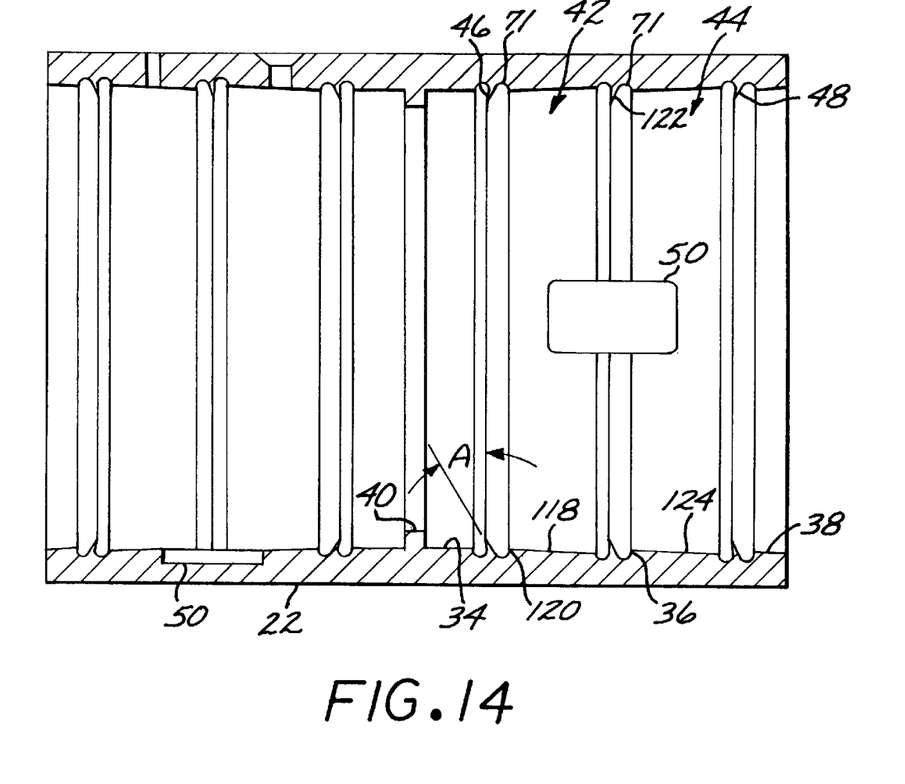
FIG. 14 is a longitudinal section of fitting of FIG. 12.

FIG. 12 and 14 illustrate a further embodiment of the invention which, after extensive testing, has proved to be most preferred as a candidate for commercial utilization. The stop 40 and first land 34 are as in the embodiment of FIG. 2A. The first seal 46 is a flap seal that utilizes a flexible flap of the type generally depicted as element 70 of FIG. 7, except that the flap of the first seal 46 in FIG. 12 is inclined away from third land 38 and toward first land 34 by an angle A. The angle A is preferably from about 20 to about 40 degrees, and is most preferably about 30 degrees. The inclination of the flap allows the pipe 24 to pass over the flap seal easily upon insertion as the flap bends to conform to the outer surface of the pipe, and also, after insertion, forms a tight seal with the pipe. The undercuts 71 are provided to improve the flexibility of the flap, as in the embodiment of FIG. 7. The flap seal with this inclined design has proved so successful in testing that it may be used even for demanding sealing applications. It has the advantage over the sealing approaches of FIGS. 5–6 that it is fabricated integral with the material of the body 26, thereby reducing the cost of manufacture of the fitting 20.

In the embodiment of FIGS. 12 and 14, a tapered wall 118 lies adjacent to the first seal 46 and is tapered inwardly with increasing distance from the third land 38. The portion of the tapered wall 118 marked as the first recess 42 performs as the recess function, while another portion furthest from the third land 38 acts as another land, a fourth land 120. A new seal, the third seal 122, is placed between the first recess 42 and the second land 36. The third seal 122 is preferably an inclined flap seal of the same type as the seal 46 of FIG. 12. A tapered wall 124 extends between the third seal 122 and the second seal 48, with the tapered wall 124 tapering inwardly with increasing distance from the third land 38. As with the tapered wall 118, the portion of the tapered wall nearest the third land 38 and the second seal 48 forms the second recess 44, while the portion furthest from the third land 38 and adjacent to the third seal 122 forms the second land 36. The second seal 48 is preferably an inclined flap seal of the same type as the seal 46 of FIGS. 12 and 14. The third land 38 is preferably tapered inwardly with increasing distance from the end of the fitting and decreasing distance from the first land 34.

The angle B of tapering of the two tapered walls 118 and 124, and the tapering of the third land 38, is exaggerated in FIG. 12 for clarity of illustration. In reality, the taper angle B is about 4–6 degrees. This tapering improves the smoothness of insertion of the pipe 24 into the fitting 22. In combination with the inclination of the seals 46, 48, and 122, the tapering of the walls 118 and 124 has also been found to yield excellent support for the hollow pipe 24 after insertion and also excellent sealing performance between the recesses 42 and 44 as the fluid cement is injected.

Figure 13:
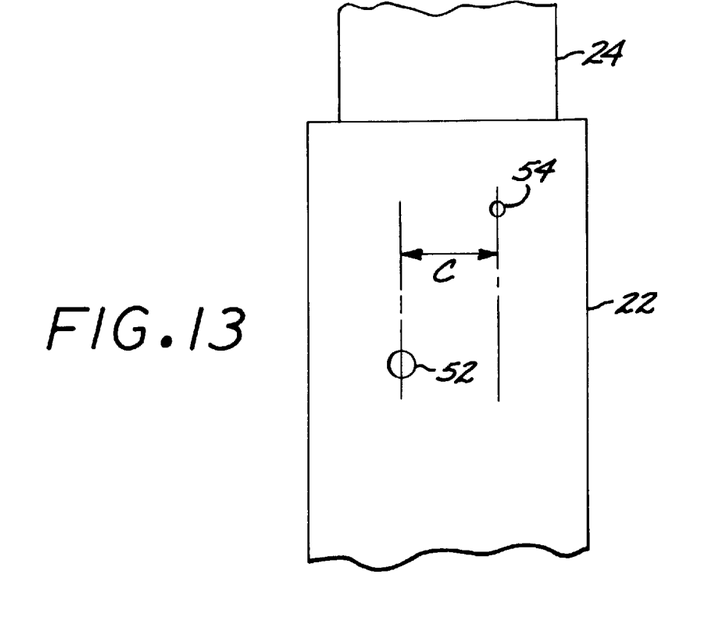
FIG. 13 is a elevational view of an embodiment of the fitting, wherein the fluid injection port and the fluid vent port are slightly angularly offset from each other.

FIG. 13 illustrates another embodiment of the coupling 22 wherein the fluid injection port 52 and the fluid vent port 54 are angularly offset from each other by a circumferential angle C, which is preferably about 10 degrees. The ports 52 and 54 are angularly offset so that, if the port 54 is above the port 52 (or any other injection ports or fluid vent ports in a more complex fitting) in the manner shown and fluid cement flows from the port 54 during the injection process, it will not flow downwardly onto any other injection ports or fluid vent ports. This small angular offset does not interfere with the functioning of the cement flow as discussed in relation to FIG. 4.

Extensive testing has been performed on prototypes of the various embodiments described herein. The tests have shown that all of the embodiments are operable. However, the angled seals of the type illustrated as elements 46, 48, and 122 in FIG. 12 are particularly effective in allowing insertion of the pipe into the fitting and achieving a good seal after insertion. The addition of the seal 122 in FIG. 12 ensures that the cement cannot flow across the narrowed second land during injection. The approach of FIG. 12 using tapered wall segments results in a thinner but fully effective layer of cement, as compared with existing fittings and the other embodiments of the present invention. An important advantage of the present invention is that the amount of solvents initially present in the cement and released to the atmosphere is significantly reduced as compared with prior approaches, which is desirable for environmental and health reasons. It is estimated that the release of solvents from a fitting made and used according to the present invention is reduced about 80–95 percent as compared with prior methods and designs, because most of the solvent is retained within the body of the fitting.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A connector structure to be used with a pipe of a pipe nominal diameter, comprising a hollow body having an external surface and including at least a first coupling, the first coupling including first internal land;

a second internal land;

a third internal land;

a fourth internal land positioned between the first internal land and the second internal land, wherein the first internal land, the second internal land, the third internal land, and the fourth internal land are collinear and of a diameter sufficiently larger than the pipe nominal diameter to permit the pipe to be slipped into the hollow body, and wherein each of the internal lands is tapered inwardly with increasing distance from an end of the first coupling, a first circumferential seal located at the first internal land, wherein the first circumferential seal comprises a circumferential extending flap;

a second circumferential seal located at the second internal land, wherein the second circumferential seal comprises a circumferentially extending flap;

a circumferentially extending internal first cement flow volume lying between the fourth internal land and the second internal and;

a third circumferential seal located between the first cement flow volume and the second internal land, wherein the third circumferential seal comprises a circumferentially extending flap;

a circumferentially extending internal second cement flow volume lying between the second land and the third land;

a gate channel through the second land communicating between the first cement flow volume and the second cement flow volume at a gate channel circumferential location;

an injection port communicating between the first cement flow volume and the external surface at a port circumferential location, the port circumferential location being circumferentially remote from the gate channel circumferential location; and a vent port communicating between the second cement flow volume and the external surface at about the port circumferential location.

2. The connector structure of claim 1, wherein the coupling further includes a stop extending radially inwardly from the first internal land.

3. The connector structure of claim 1, wherein the body further includes a second coupling having the same structure as the first coupling, wherein the second coupling is in fluid communication with the first coupling.

4. The connector structure of claim 3, wherein the body further includes a third coupling having the same structure as the first coupling, wherein the third coupling is in fluid communication with the first coupling and the second coupling.

5. The connector structure of claim 1, wherein the body is made of a plastic.

6. The connector structure of claim 1, wherein the body is made of a plastic selected from the group consisting of poly(vinyl chloride), acrylonitrile butadiene-styrene, and chlorinated poly(vinyl chloride).

7. The connector structure of claim 1, wherein the vent port has a smaller cross sectional area than the injection port.

8. The connector structure of claim 1, further including
   a mass of cement lying within the first cement flow volume, the second cement flow volume, and the gate channel.

9. The connector structure of claim 8, wherein the cement substantially fills the first cement flow volume, the second cement flow volume, and the gate channel.

10. The connector structure of claim 1, wherein the coupling is, at least in part, transparent.

11. The connect structure of claim 1, wherein the flap of each of the first circumferential seal, the second circumferential seal, and the third circumferential seal is angled away from the end of the first coupling.

12. The connector structure of claim 1, wherein the flap of each of the first circumferential seal, the second circumferential seal, and the third circumferential seal is angled away from the end of the fist coupling by an angle of from about 20 to about 40 degrees.

13. The connector structure of claim 1, further including
   an undercut adjacent to the flap of each of the fist circumferential seal, the second circumferential seal, and the third circumferential seal.

14. The connector structure of claim 1, wherein the angle of taper of each of the internal lands is about 4–6 degrees.

15. The connector structure of claim 1, wherein the port circumferential location is displaced by about 180 degrees around the circumference of the body from the gate channel circumferential location.

16. The connector structure of claim 1, wherein each of the circumferential flaps has a thickness of about 0.005 inch.

17. The connector structure of claim 1, wherein the coupling is generally cylindrical about a cylindrical axis.

18. The connector structure of claim 1, wherein each of the flaps is formed of the same material as the body.

19. The connector structure of claim 1, wherein the body is formed of a relatively rigid material, and each of the flaps is formed of the same material as the body.

20. A connector structure comprising a hollow body having an external surface and including at least a first coupling, the first coupling including a first internal raised region;

a second internal raised region;

a third internal raised region;

a fourth internal raised region positioned between the first internal raised region and the second internal raised region, wherein the first internal raised region, the second internal raised region, the third internal raised region, and the fourth internal raised region are disposed so as to receive therein a pipe inserted into the coupling, and wherein each of the internal raised regions is tapered inwardly with increasing distance from an end of the first coupling;

a first circumferential seal located at the first internal raised region, wherein the first circumferential seal comprises a circumferentially extending flap;

a second circumferential seal located at the second internal raised region, wherein the second circumferential seal comprises a circumferentially extending flap;

a circumferentially extending internal first fluid cement flow volume lying between the fourth internal raised region and the second internal raised region;

a third circumferential seal located between the first fluid cement flow volume and the second internal raised region, wherein the third circumferential seal comprises a circumferentially extending flap;

a circumferentially extending internal second fluid cement flow volume lying between the second raised region and the third raised region;

a gate channel communicating between the first fluid cement flow volume and the second fluid cement flow volume at a gate channel circumferential location;

an injection port communicating between the first fluid cement flow volume and the external surface at a port circumferential location, the port circumferential location being circumferentially remote from the gate channel circumferential location; and a vent port communicating between the second fluid cement flow volume and the external surface at about the port circumferential location.

* * * * *